(12) United States Patent
Hoop

(10) Patent No.: US 10,201,858 B2
(45) Date of Patent: *Feb. 12, 2019

(54) DRILL BIT WITH AN EXCHANGEABLE CUTTING PORTION

(71) Applicant: Hilti Aktiengesellschaft, Schaan (LI)

(72) Inventor: Matthaeus Hoop, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,459

(22) PCT Filed: Dec. 20, 2013

(86) PCT No.: PCT/EP2013/077690
§ 371 (c)(1),
(2) Date: Jun. 19, 2015

(87) PCT Pub. No.: WO2014/096360
PCT Pub. Date: Jun. 26, 2014

(65) Prior Publication Data
US 2015/0328694 A1    Nov. 19, 2015

(30) Foreign Application Priority Data

Dec. 21, 2012 (WO) .................. PCT/EP2012/076774
May 8, 2013 (EP) ..................................... 13166990

(51) Int. Cl.
*B23B 51/04* (2006.01)
*B23B 31/113* (2006.01)
(Continued)

(52) U.S. Cl.
CPC ........ *B23B 31/113* (2013.01); *B23B 51/0406* (2013.01); *B28D 1/041* (2013.01);
(Continued)

(58) Field of Classification Search
CPC . B23B 51/04; B23B 51/0473; B23B 51/0466; B23B 2240/04; B23B 2251/02;
(Continued)

(56) References Cited

U.S. PATENT DOCUMENTS 2,015,339 A * 9/1935 Ellingham .......... B23B 51/0406
408/199
3,382,743 A * 5/1968 Trevathan ........... B23B 51/0406
125/20
(Continued)

FOREIGN PATENT DOCUMENTS

CA          2291279 A1 * 12/1998 ........... B23B 31/005
CN        101405103 A      4/2009
(Continued)

OTHER PUBLICATIONS

Machine transaltion of Japan patent document, JP2002120218A, "Core drill for concrete", Ichikawa Shinichi, Apr. 2002.*
(Continued)

*Primary Examiner* — Daniel Howell
*Assistant Examiner* — Chwen-Wei Su
(74) *Attorney, Agent, or Firm* — Crowell & Moring LLP

(57) ABSTRACT

A drill bit, which is rotatable in a direction of rotation about an axis of rotation, is disclosed. The drill bit has a cutting portion with an annular portion where the annular portion has a first end on which is a cutting element and has at a second end a first insertion element. The drill bit has a drill shaft portion with a cylindrical drill shaft which has at an end, towards the cutting portion, a second insertion element. In a direction of insertion parallel to the axis of rotation, the insertion elements form a plug-in connection and can be additionally connected by way of at least one pin element which is movable in at least one slit-shaped clearance.

20 Claims, 7 Drawing Sheets

(51) Int. Cl.
*E21B 17/046* (2006.01)
*B28D 1/04* (2006.01)
*E21B 10/62* (2006.01)

(52) U.S. Cl.
CPC ............ *E21B 10/62* (2013.01); *E21B 17/046* (2013.01); *B23B 51/0466* (2013.01); *B23B 2240/04* (2013.01); *B23B 2251/02* (2013.01); *B23B 2251/428* (2013.01); *Y10T 408/895* (2015.01)

(58) Field of Classification Search
CPC ..... B28D 1/146; Y10T 408/94; Y10T 408/95; Y10T 408/8953
USPC ............................................ 125/20; 175/403
See application file for complete search history.

(56) References Cited

U.S. PATENT DOCUMENTS

| | | | | |
|---|---|---|---|---|
| 3,610,768 A | * | 10/1971 | Cochran | ............ B23B 51/0466 125/20 |
| 3,888,320 A | | 6/1975 | Maxwell | |
| 4,474,488 A | | 10/1984 | Pinkerton et al. | |
| 4,941,783 A | | 7/1990 | Maier | |
| 5,007,777 A | * | 4/1991 | Itokazu | ................. B23B 51/042 408/206 |
| 5,054,971 A | * | 10/1991 | Kieninger | ................. B26F 1/32 408/144 |
| 5,082,070 A | | 1/1992 | Obermeier et al. | |
| 2007/0020056 A1 | | 1/2007 | Burdick | |

FOREIGN PATENT DOCUMENTS

| | | | |
|---|---|---|---|
| CN | 101848788 A | 9/2010 | |
| DE | 38 10 540 A1 | 10/1989 | |
| DE | 39 37 697 A1 | 5/1991 | |
| DE | 103 57 505 B4 | 5/2005 | |
| EP | 0 477 253 B1 | 4/1992 | |
| FR | 2860829 A1 * | 4/2005 | ........... B23B 31/113 |
| JP | 59-105311 U | 7/1984 | |
| JP | 1-290889 A | 11/1989 | |
| JP | 2-90006 U | 7/1990 | |
| JP | 3-154703 A | 7/1991 | |
| JP | 4-75812 A | 3/1992 | |
| JP | 11010417 A * | 1/1999 | |
| JP | 2002120218 A * | 4/2002 | ........... B23B 31/113 |
| JP | 2007136643 A * | 6/2007 | |
| KR | 10-2005-0034151 A | 4/2005 | |
| RU | 2 237 148 C2 | 7/2001 | |
| SU | 392240 A2 | 7/1973 | |

OTHER PUBLICATIONS

Machine translation of Japan patent document, JPH1110417 (A), "Fitting Structure of Rotating Tool", Omi Katsuhei et al., Jan. 19, 1999.*
Machine translation of Japan patent document, JP2007136643 (A), "Core Drill", Miyanaga Masaaki, Jun. 7, 2007.*
Machine translation, Japan patent document, JP 2007-136643, Miyanaga, M., Jun. 7, 2007.*
Machine translation, Japan patent document, JP 59-105311, Kodera, Jul. 16, 1984.*
PCT/EP2013/077690, International Search Report dated Apr. 4, 2014 (Two (2) pages).
European Search Report dated Apr. 4, 2014, with Statement of Relevancy (Four (4) pages).
U.S. Patent Application, "Cutting Portion for a Drill Bit", U.S. Appl. No. 14/654,456, filed Jun. 19, 2015, Inventor Matthaeus Hoop.
U.S. Patent Application, "Drill Bit with an Exchangeable Cutting Portion", U.S. Appl. No. 14/654,461, filed Jun. 19, 2015, Inventor Matthaeus Hoop et al.
English translation of Korean Office Action issued in Korean counterpart application No. 10-2015-7019254 dated Jun. 10, 2016 (Eight (8) pages).
Russian Office Action issued in Russian counterpart application No. 2015129594/02(045655) dated Oct. 27, 2016 (Two (2) pages).
Chinese Office Action issued in Chinese counterpart application No. 201380071785.5 dated Jul. 4, 2016 (Eight (8) pages).
Chinese Notification of the Second Office Action issued in Chinese counterpart application No. 201380071785.5 dated Mar. 16, 2017 (Eight (8) pages).

* cited by examiner

DRILL BIT WITH AN EXCHANGEABLE CUTTING PORTION

This application claims the priority of International Application Nos. PCT/EP2013/077690, filed Dec. 20, 2013, PCT/EP2012/076774, filed Dec. 21, 2012, and European Patent Document No. 13166990.5, filed May 8, 2013, the disclosures of which are expressly incorporated by reference herein.

BACKGROUND AND SUMMARY OF THE INVENTION

The present invention relates to a drill bit having an exchangeable cutting portion.

The term "drill bit" should be understood to encompass all drilling tools having a hollow, cylindrical drill shaft having one or more cutting elements, for example, core drill bits and drill bits for socket outlets. Independently of their intended use, the drill bits may comprise additional elements such as, for example, a depth stop that limits the depth of the bore.

Drill bits are comprised of a cutting portion having one or more cutting elements, a drill shaft portion, and a receiving portion having an insertion end. The drill bit is attached in the tool receptacle of a core drill via the insertion end and, during drilling operation, driven by the core drill in a rotational direction around an axis of rotation. Known drill bits are divided into drill bits having an exchangeable cutting portion and drill bits without an exchangeable cutting portion, with the drill bits having an exchangeable cutting portion being further divided into detachable and non-detachable connections. A connection is considered detachable if the connection can be detached by the user in a non-destructive manner such as, for example, a plug-and-socket connection, a screw connection, or a magnetic connection. A connection is considered non-detachable if the user is able to release the connection only by destroying the fastener such as, for example, a solder connection, a welded connection, a riveted connection, or an adhesive connection.

In the drill bits disclosed in U.S. Pat. No. 3,888,320 A, the cutting portion and the drill shaft portion are connected to one another via a removable plug-and-twist connection. The cutting portion comprises an annular portion connected on a first end to a plurality of cutting elements and, on a second end, having an exterior insertion element and an annular limit stop shoulder. The drill shaft portion comprises a cylindrical drill shaft that comprises an interior insertion element having a face on an end facing the cutting portion. The insertion elements form a plug connection in an insertion direction parallel to the axis of rotation. The exterior insertion element comprises a plurality of pin elements in its interior that are directed radially inward in a plane running perpendicular to the axis of rotation. The interior insertion element comprises a plurality of L-shaped clearance slits into which the pin elements are inserted. The L-shaped clearances comprise a transverse slit running perpendicular to the axis of rotation and a connector slit running parallel to the axis of rotation and connecting the transverse slit to a lower edge of the interior insertion element.

In the known drill bit with an exchangeable cutting portion, when the plug-and-twist connection is closed, axial play is present between the cutting portion and the drill shaft portion in a direction parallel to the axis of rotation. A gap is formed between the face of the interior insertion element and the limit stop shoulder of the exterior insertion element such that the transmission of force from the drill shaft portion to the cutting portion occurs exclusively via the pin elements. Moreover, the gap leads to a cooling and rinsing medium not being completely supplied to the work surface, but rather to the possibility of the medium being misdirected into the gap on the interior of the drill bit.

An additional disadvantage of the known drill bit having an exchangeable cutting portion shows itself when the drill bit becomes jammed in the substrate. In core drilling, it is common for the drill bit to become jammed in the substrate during drilling and need to be removed by the operator. In stand-guided core drilling units, in order to remove a jammed drill bit, the drill bit is driven opposite the rotational direction and the drill stand exerts a tensile force on the drill bit directed opposite the drilling direction. The operator attempts to free the drill bit from the substrate by manually turning it with the aid of a tool key and, at the same time, pulling it with the aid of the drill stand. The L-shaped clearances present the risk that the operator will rotate the drill shaft portion around the axis of rotation until the pin element impacts the connector slit and, at the same time, activates the handwheel of the drill stand, such that the pin element is moved out of the connector slit. As soon as the plug-and-twist connection between the cutting portion and the drill shaft portion has been released, the cutting portion must be freed from the substrate using other means, for example, by removing the substrate.

The object of the present invention is to develop a drill bit with an exchangeable cutting portion in which the risk is reduced that, during the removal of a jammed drill bit from the substrate, the plug-and-twist connection of the insertion element is unintentionally opened and the drill shaft portion is removed from the substrate without the cutting portion. Moreover, the stability of the drill bit during drilling and its ability to withstand the exertion of tensile force by a drill stand should be increased.

Provision is made according to the invention for the clearance slits to comprise a connector slit and a transverse slit having a catching region and the locking region, with the catching region being connected to the connector slit on a side of the connector slit facing the direction of rotation and with the locking region being connected to the connector slit on a side of the connector slit opposite the direction of rotation.

The transmission of torque from the drill shaft portion to the cutting portion occurs via the pin elements and the catching region. The locking region is located on the side of the connector slit opposite the catching region. The locking region reduces the risk of the plug-and-twist connection between the drill shaft portion and the cutting portion being unintentionally opened during the removal of a jammed drill bit from the substrate. The operator attempts to free the jammed drill bit from the substrate by rotating the drill shaft portion around the axis of rotation with the aid of a tool key and, at the same time, pulling with the aid of the drill stand. Practical experience has shown that operators primarily pull on the drill shaft portion when the pin element is striking the transverse slits. In the drill bit according to the invention, if the pin element strikes on the catching region or on the locking region, there is no risk that the plug-and-twist connection can be opened. In the drill bit according to the invention, the plug-and-twist connection is only opened if the operator pulls on the drill shaft portion at the precise moment when the pin element is located over the connector slit. The risk of unintentionally opening the plug-and-twist connection is considerably reduced as compared to L-shaped slit clearances.

The height of the connector slit parallel to the axis of rotation is preferably at least 10 mm. A height of at least 10 mm guarantees a sufficient ability of the cutting portion to withstand the tensile force exerted by a drill stand.

Here, it is particularly preferable for the height of the connector slit parallel to the axis of rotation not to exceed 13 mm. Up to a height of 13 mm, the ability of the cutting portion to withstand the tensile force exerted by a drill stand is improved. Greater heights have no influence or very little influence on the ability of the cutting portion to withstand the tensile force exerted by a drill stand and only incur additional material and processing costs.

It is preferable for the transverse slit parallel to the axis of rotation to be located at a lower distance from the annular portion of at least 3 mm. A minimum distance of 3 mm ensures sufficient ability of the cutting portion to withstand the tensile force exerted during the removal of a jammed drill bit with the aid of a drill stand.

Here, it is particularly preferable for the lower distance of the transverse slit from the annular portion not to exceed 5 mm. Up to a distance of 5 mm, the ability of the cutting portion to withstand tensile force is improved. Greater distances have no or very little influence on the ability of the cutting portion to withstand tensile force and only incur additional material and processing costs.

In a preferred embodiment of the drill bit, the pin elements have a pin height perpendicular to the axis of rotation, with the pin height being from 68% to 89% of the shaft width of the drill shaft. The width of the interior insertion element is preferably approximately 50% of the width of the drill shaft. As the pin height increases, the surface area for the transmission of torque increases as well. In addition, ability to withstand tensile force is improved.

It is particularly preferable for the pin elements to be embodied in the shape of a circular cylinder with a pin radius, the pin radius being from 2.5 to 5 mm. The transmission of torque from the drill shaft segment to the cutting segment occurs by way of the pin elements and the outer insertion element. The greater the pin radius of the pin elements, the fewer pin elements are necessary for the transmission of torque.

It is preferable for the width of the catching region to be no less than the pin radius plus 1.5 mm. At this minimum width for the catching region, sufficient ability of the cutting portion to withstand the tensile force exerted by a drill stand is ensured. The pin elements rest against the catching region and do not break out of the catching region.

Here, it is particularly preferable for the width of the catching region to be no greater than the pin radius plus 3 mm. Up to a width of half the pin diameter plus 3 mm, the ability of the cutting portion to withstand the tensile force exerted by a drill stand is improved. Greater widths have no or very little influence on the ability of the cutting portion to withstand tensile force and unnecessarily reduce the stability of the cutting portion.

In a first preferred variant, the width of the catching region and the width of the locking region correspond to one another. Here, the catching region and the locking region have a minimum width of the pin radius plus 1.5 mm. Particularly in the case of drill bits with small diameters, this embodiment allows the portion of the transverse slits on the circumference to be large.

In a second preferred variant, the width of the catching region is greater than the width of the locking region. Here, the catching region and the locking region have a minimum width of the pin radius plus 1.5 mm. This embodiment is particularly advantageous for drill bits with small diameters, in which the proportion of the circumference occupied by transverse slits is large.

In a preferred embodiment, the first insertion element is embodied as an outer insertion element with a limit stop shoulder and the second insertion element is embodied as an inner insertion element having a face. In the connected position, the face of the inner insertion element rests against the limit stop shoulder of the outer insertion element. The transmission of force from the drill bit portion to the cutting portion during drilling occurs by way of the face and the limit stop shoulder. The risk of deformation of the outer insertion element is reduced when the transmission of force does not occur by way of the pin elements, such that the drill bit according to the invention has a high degree of stability. The limit stop shoulder can be embodied in the shape of a ring or a ring segment. By the face resting flat against a ring-shaped limit stop shoulder, the drill bit is embodied in a watertight fashion on the other side, thus preventing the misdirection of a cooling and rinsing medium. The cooling and rinsing medium, for example, supplied via the insertion end of the drill bit, flows in its entirety to the surface being worked and ensures the cooling of the cutting elements and the removal of drillings.

It is particularly preferred for the at least one pin element to be fastened on the outer side of the inner insertion element and the outer insertion element to comprise the at least one slit-shaped clearance. The arrangement of the slit-shaped clearances on the exchangeable cutting portion has the advantage that the less stable of the two drill bits segments is regularly exchanged. The plug-and-twist connection of the insertion elements according to the invention improves the stability of the drill bit as well as its ability to withstand tensile force. The drill bit portion comprising the slit-shaped clearances is more susceptible to deformation by tensile force than the drill bit portion to which the pin elements are attached. The risk of deformation by tensile force increases along with the proportion of the slit-shaped clearances on the circumference of the insertion element. Because the diameter of the outer insertion element is greater than the diameter of the inner insertion element, more circumference is available on the outer insertion element for the slit-shaped clearances, which reduces the proportion taken up by the clearances on the circumference. The drill bit is more stable when the slit-shaped clearances are provided on the outer insertion element.

Due to the arrangement of the pin elements on the inner insertion element and the arrangement of the slit-shaped clearances on the outer insertion element, it is possible for the drill bit to be designed in a watertight fashion on the inside, thus preventing the misdirection of a cooling and rinsing medium. In the case of a watertight drill bit, all of the cooling and rinsing medium supplied, for example, via the insertion end of the drill bit, flows to the drilling surface and ensures the cooling of the cutting elements and the removal of drillings. The drill bit according to the invention also allows the operator to monitor the opening and closing of the plug-and-twist connection. Such monitoring is not possible or is possible only to a limited degree if the slit-shaped clearances are provided on the inner insertion element.

It is particularly preferred for the length of the inner insertion element to be greater than the length of the outer insertion element. The difference in length between the inner and outer insertion elements ensures that the face of the inner insertion element rests against the limit stop shoulder of the outer insertion element and, during drilling, a defined transmission of force occurs from the drill shaft portion to the cutting portion.

It is particularly preferred for the length of the outer insertion element to be at least 18 mm. At a minimum length of 18 mm for the outer insertion element, sufficient resiliency of the cutting portion is ensured. The slit-shaped clearances can be positioned on the outer insertion element at such a height that the cutting portion is fixed against tensile forces that occur during the removal of a jammed drill bit with the aid of a drill stand.

Here, it is particularly preferable for the length of the outer insertion element not to exceed 28 mm. Up to a length of 28 mm for the outer insertion element, the ability of the cutting portion to withstand tensile forces is improved. Greater lengths for the outer insertion element have no or very little influence on the ability of the cutting portion to withstand tensile force and only incur additional material and production costs.

In a preferred embodiment, the outer and inner insertion element are embodied in a ring shape, with the difference between an inner diameter of the outer insertion element and an outer diameter of the inner insertion element being greater than 0.11 mm. The gap thus formed between the outer and inner insertion elements ensures that the face of the inner insertion element rests against the limit stop shoulder of the outer insertion element. The drill bit is designed in a watertight fashion on the inside such that the supply of a liquid or gaseous cooling and rinsing medium to the cutting elements is guaranteed. Moreover, a defined transmission of force occurs from the core drilling unit via the face of the drill shaft segment onto the limit stop shoulder of the cutting portion.

In a preferred embodiment of the drill bit, three or more pin elements are attached to the outside of the inner insertion element and the outer insertion element comprises three or more slit-shaped clearances, with the number of clearances being greater than or equal to the number of pin elements. In the drill bit according to the invention, the transmission of force occurs from the face of the inner insertion element onto the limit stop shoulder of the outer insertion element and the transmission of torque occurs via the pin elements onto the outer insertion element. Here, it is particularly preferred for the pin elements to be evenly distributed around the axis of rotation of the drill bit. The even distribution of the pin elements allows for the assignment of pin elements to clearances to be omitted and a pin element may be inserted into any of the clearances.

The number of the slit-shaped clearances must be greater than or equal to the number of pin elements. In order to close the plug-and-twist connection, a slit-shaped clearance must be provided for each pin element. The design of the drill bit in which the number of clearances is greater than the number of pin elements has the disadvantage that the stability of the cutting portion is unnecessarily reduced. Such a design is only suitable, if at all, for drill bits with very large diameters because, in such drill bits, the proportion of the clearances on the circumference of the outer insertion element is less than is the case in drill bits with small diameters.

It is particularly preferable for six pin elements to be fastened on the outer side of the inner insertion element and for the outer insertion element to comprise six or more slit-shaped clearances. A rotary connection with six pin elements having a pin diameter of 6 mm is suitable for the transmission of torque for drill bits with various diameters, for example, from 50 mm to 250 mm.

In a refinement of the drill bit, the annular portion comprises a guide portion, with the guide portion being flush against an outer edge, an inner edge, or an inner and outer edge of the cutting elements, the edge being parallel to the longitudinal axis. Due to the flush fit of the guide portion with the cutting elements, the guide portion forms a guide for the cutting elements during drilling and stabilizes the cutting elements. Here, guidance may occur on the outside of the drill bit via the substrate surrounding the drill bore or the inside of the drill bit via the drill core.

It is preferable for the length of the guide portion parallel to the axis of rotation to be less than 4 mm. A guide portion that is smaller than 4 mm does not hinder the supply of a cooling and rinsing medium at all, or at least not substantially.

In a preferred embodiment of the drill bit, a nose is disposed on the outside of the inner insertion element and the outer insertion element comprises a groove, with the nose and the groove forming a positive fit in the axial direction in their connected state. Due to the additional positive connection between the drill shaft portion and the cutting portion, the risk of the detachable connection between the drill shaft portion and the cutting portion being unintentionally opened in the course of removing a jammed drill bit from the substrate may be further reduced. The design of the positive attachment means as a nose and a groove allows for a simple and reliable connection that impedes the removal of the drill shaft portion from the cutting portion. The retention forces of the connection may be adapted to the area of operation of the drill bit using the geometry of the nose and the groove.

It is preferable for the nose to be disposed between the pin elements and the drill shaft in the axial direction and for the groove to be disposed in the axial direction at the level of the slit-shaped clearances. Portions develop between the slit-shaped clearances of the outer insertion element that display an elastic effect. The elastic effect can be adjusted via the number and axial height of the slit-shaped clearances and the length of the outer insertion element. In order to separate the drill shaft portion from the cutting portion, a force is exerted in the axial direction on the face of the outer insertion element with the aid of a tool. The exertion of force deflects the elastic segment of the outer insertion element and the positive connection between the nose and the groove can be removed. The greater the distance of the groove from the limit stop shoulder of the outer insertion element, the greater the deflection of the elastic segment.

It is particularly preferred for the groove to have an annular design and be disposed in a plane perpendicular to the axis of rotation. A groove with an annular design that is disposed at the level of the slit-shaped clearances supports the elastic effect of the portions of the outer insertion element between the slit-shaped clearances.

The axial direction is defined here as a direction parallel to the axis of rotation of the drill bit. In the connected state of the drill bit portions, the axis of rotation of the drill bit coincides with the longitudinal axes of the drill bit portions, the cutting portion, and the drill shaft portion. A radial plane is defined as a plane perpendicular to the axis of rotation, and a radial direction is a direction running in the radial plane and intersecting the rotational axes of the drill bit or the longitudinal axis of the drill bit portions.

Exemplary embodiments of the invention will be described below with reference to the drawings. The drawings are not necessarily intended to show the exemplary embodiments to scale; rather, the drawings are shown in a schematic and/or slightly distorted manner when it aids understanding to do so. With regard to elaborations on the teachings immediately discernible from the drawings, we refer to the relevant prior art. It should be noted here that numerous modifications and alterations may be made regarding the form and details of an embodiment without deviating from the general concept of the invention. The features of the invention disclosed in the specification, the drawings, and the claims may be considered essential to the refinement of the invention either alone or in any combination. In addition, all combinations of at least two features disclosed in the specification, the drawings, and/or the claims may be considered to fall within the scope of the invention. The general concept of the invention is not limited to the exact form or details of the exemplary embodiment shown and described in the following or limited to an object that would be considered limited in comparison to the object disclosed in the claims. In the case of measurement ranges given, values lying within the ranges named as boundary values should also be considered claimed and usable in any desired manner. For the sake of simplicity, the same reference characters have been used in the following for identical or similar parts or parts with an identical or similar function.

DETAILED DESCRIPTION OF THE DRAWINGS

Figure 1A:
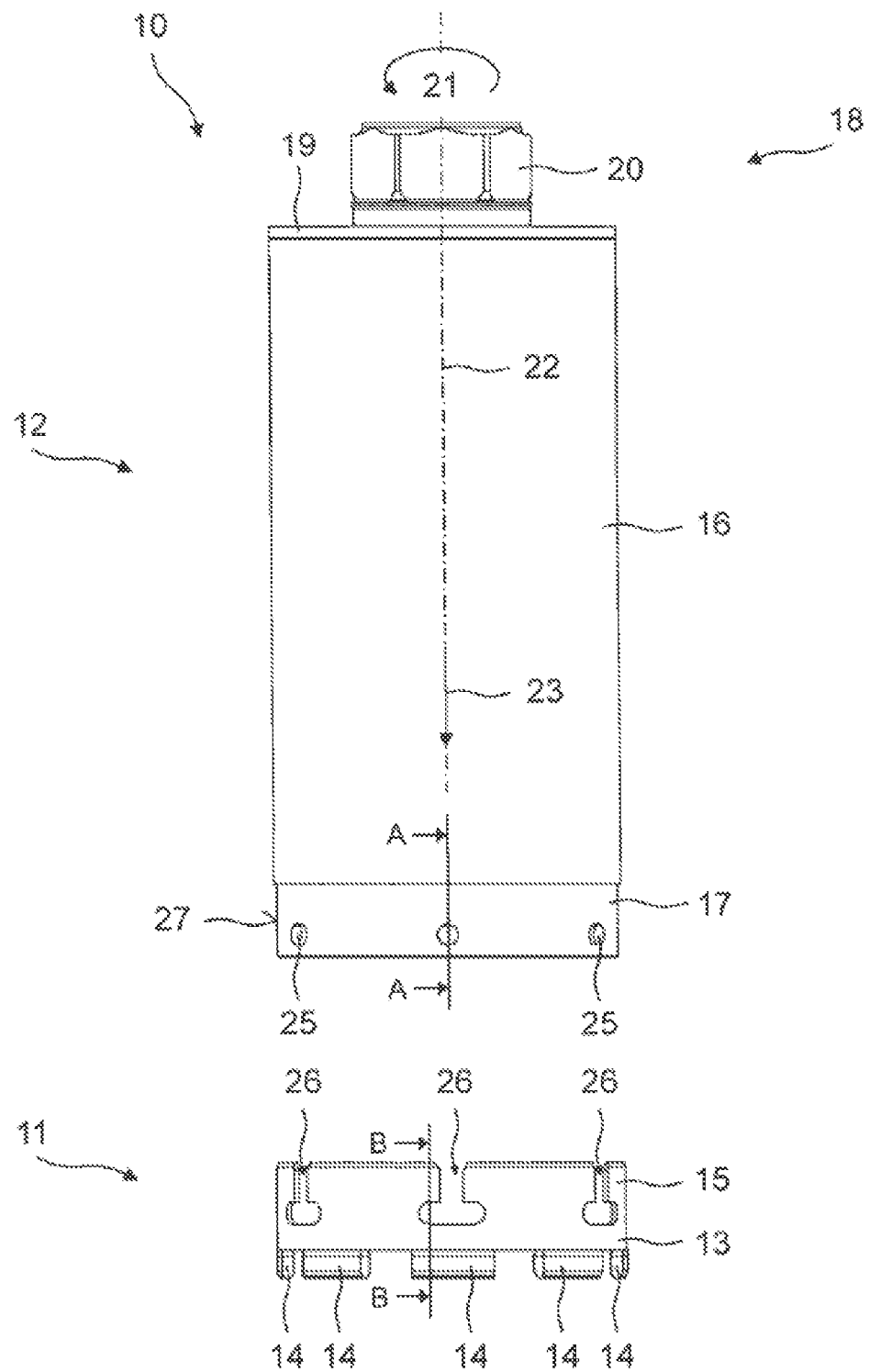
FIGS. 1A, B illustrate the drill bit according to the invention having a cutting portion and a drill shaft portion in its non-connected state (FIG. 1A) and in its connected state (FIG. 1B)

FIGS. 1A, B show a drill bit 10 according to the invention having a cutting portion 11 that is connected via a removable plug-and-twist connection to a drill shaft portion 12. FIG. 1A shows the cutting portion 11 and the drill shaft portion 12 in their non-connected state with the plug-and-twist connection open and FIG. 1B shows the cutting portion 11 in the drill shaft portion 12 in their connected state with the plug-and-twist connection closed.

The cutting portion 11 comprises an annular portion 13 that is connected on a first end to a plurality of cutting elements 14 and, on a second end, comprises a first insertion element 15. Here, the first insertion element is designed as an outer insertion element 15. The cutting elements 14 are welded, soldered, bolted, or attached in some other suitable manner to the annular portion 13. The cutting portion 11 may, instead of a plurality of cutting elements 14, also comprise a single cutting element embodied as a cutting sleeve, which is connected to the annular portion 13.

The drill shaft portion 12 comprises a cylindrical drill shaft 16 that comprises a second insertion element 17 on an end facing the cutting portion 11 and, on an end opposite the cutting portion 11, is connected to a receiving portion 18. Here, the second insertion element is embodied as an inner insertion element 17. The receiving portion 18 comprises a cover 19 and an insertion end 20. The drill bit 10 is fastened in the tool receptacle of a core drilling device via the insertion end 20. During drilling operation, the drill bit 10 is driven by the core drilling device in a rotational direction 21 around an axis of rotation 22 and in a drilling direction 23 parallel to the axis of rotation 22 in the substrate to be drilled. The axis of rotation 22 runs coaxially to a longitudinal axis of the drill shaft 16 and a longitudinal axis of the annular portion 13. The drill bit 10 has a circular cross-section perpendicular to the axis of rotation 22; alternately, drill bits according to the invention may also have other suitable cross-sections such as, for example, a polygonal cross-section.

Figure 1B:
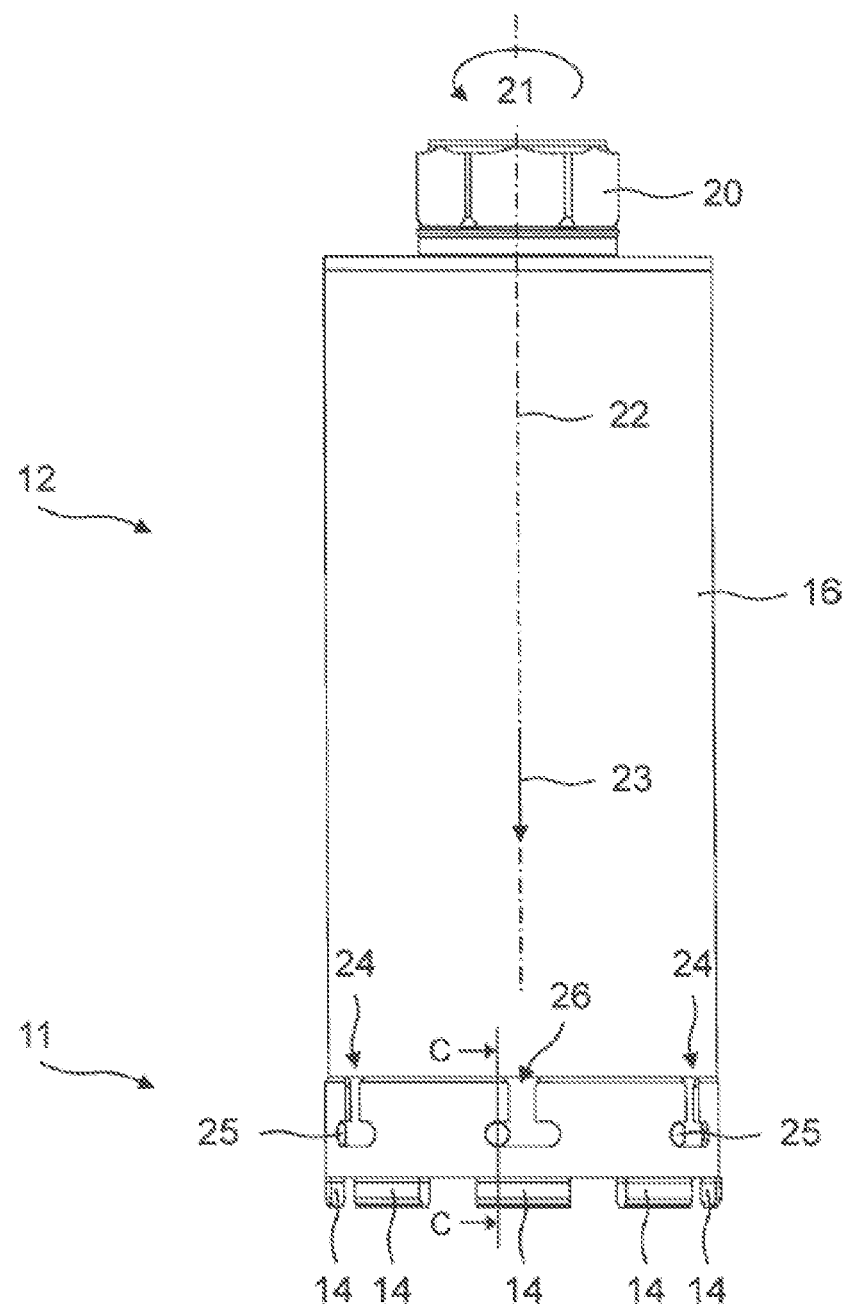

The cutting portion 11 is connected to the drill shaft portion 12 via a plug-and-twist connection 24 (FIG. 1B). The term "plug-and-twist connection" is used to describe connections of two connector elements that form a plug connection in at least one direction, with the inserted connector elements additionally being connected via a twist connection. Here, the plug connection and the twist connection may be closed one after the other or simultaneously. The plug-and-twist connection 24 must connect the cutting portion 11 and the drill shaft portion 12 in all translational and rotational directions. The cutting portion 11 must be secured against translations in the drilling direction 23, opposite the drilling direction 23, and radially in the drilling direction 23 as well as against rotations around the axis of rotation 22.

The cutting portion 11 is connected by placing the outer insertion element 15 over the inner insertion element 17 of the drill shaft portion 12, with the insertion direction of the plug connection running parallel to the axis of rotation 22. The plug connection of the insertion elements 15, 17 secures the cutting portion against translations opposite the drilling direction 23 and radially to the axis of rotation 22. Via the twist connection of the insertion elements 15, 17, the cutting portion 11 must be secured against a rotation around the axis of rotation 22 and against a translation in the drill direction 23. The twist connection comprises six pin elements 25 that are inserted into six slit-shaped clearances 26. The six pin elements 25 are attached on the outer side 27 of the inner insertion element 17 and the six slit-shaped clearances 26 are provided on the outer insertion element 15. The pin elements 25 and the clearances 26 are distributed in an even fashion around the axis of rotation 22. Due to the even distribution, the assignment of an element 25 to a clearance 26 is unnecessary, and a pin element 25 may be inserted into any clearance 26.

The cutting portion 11 may be attached by the operator to the drill shaft portion 12 in a simple and quick manner. To this end, the cutting portion 11 with its outer insertion element 15 is connected by insertion to the inner insertion element 17 of the drill shaft portion 12 in such a way that the pin elements 25 are disposed in the slit-shaped clearances 26. The cutting portion 11 is moved in the insertion direction and subsequently secured by a rotation around the axis of rotation 22.

Figure 2A:
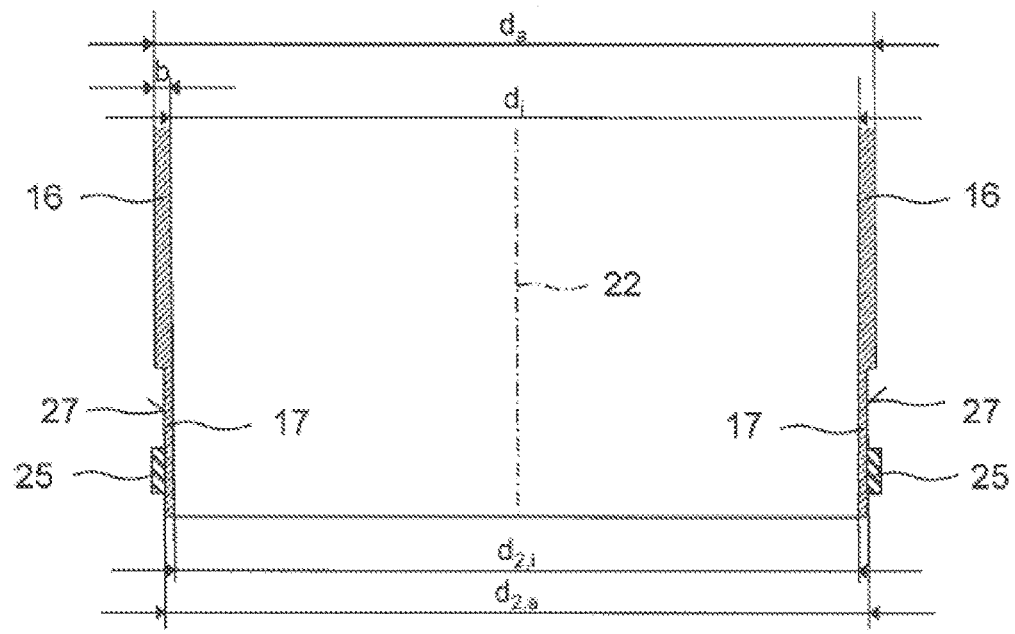
FIGS. 2A, B illustrate the drill shaft portion of the drill bit shown in FIG. 1 in a longitudinal section along the section plane A-A in FIG. 1A (FIG. 2A) and the insertion element of the drill shaft portion in an enlarged view (FIG. 2B)

FIGS. 2A, B show the drill shaft portion 12 of the drill bit 10 according to the invention in the longitudinal section along a sectional plane A-A in FIG. 1A. FIG. 2A shows the drill shaft portion 12 and FIG. 2B shows the second insertion element 17 embodied as an inner insertion element in an enlarged view.

The drill shaft portion 12 comprises the cylindrical drill shaft 16 and the inner insertion element 17, which is designed monolithically. As an alternative to a monolithic design, the inner insertion element 17 may be embodied as a separate part and be subsequently connected to the drill shaft 16. On the outer side 27 of the inner insertion element 17, the pin elements 25 are fastened. The pin elements 25 and the inner insertion element 17 may be made of different materials and connected to one another or they may be made of the same material and the pin elements 25 may be generated using deformation methods such as punching or penetration.

The drill shaft 16 has an outer diameter $d_a$, perpendicular to the axis of rotation 22, an inner diameter $d_i$, and a drill shaft width b, $b=(d_A-d_i)/2$. The inner insertion element 17 has an outer diameter $d_{2,a}$ perpendicular to the axis of rotation 22 and an inner diameter $d_{2,i}$. Here, the inner diameter $d_{2,i}$ of the inner insertion element 17 corresponds to the inner diameter $d_i$ of the drill shaft 16 and the outer diameter $d_{2,a}$ of the inner insertion element 17 is less than the outer diameter $d_a$ of the drill shaft 16, such that an annular step forms on the outside of the drill shaft portion 12.

Figure 2B:
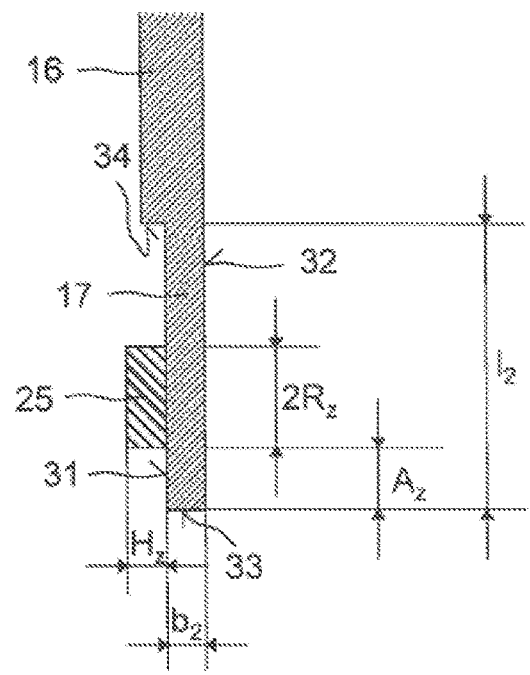

FIG. 2B shows the inner insertion element 17 in an expanded view. The inner insertion element 17 comprises an exterior jacket surface 31, an interior jacket surface 32, and a face 33. An annular limit stop shoulder 34 is located at the transition from the drill shaft 16 to the inner insertion element 17.

The inner insertion element 17 has a length l2 parallel to the axis of rotation 22 and a width $b_2$ perpendicular to the axis of rotation 22. The pin element 25 has a cylindrical design with a pin radius $R_Z$ parallel to the axis of rotation 22 and a pin height $H_Z$ perpendicular to the axis of rotation 22. The lower edge of the pin element 25 is located parallel to the axis of rotation 22 at a distance $A_Z$ from the face 33 of the inner insertion element 17.

Figure 3A:
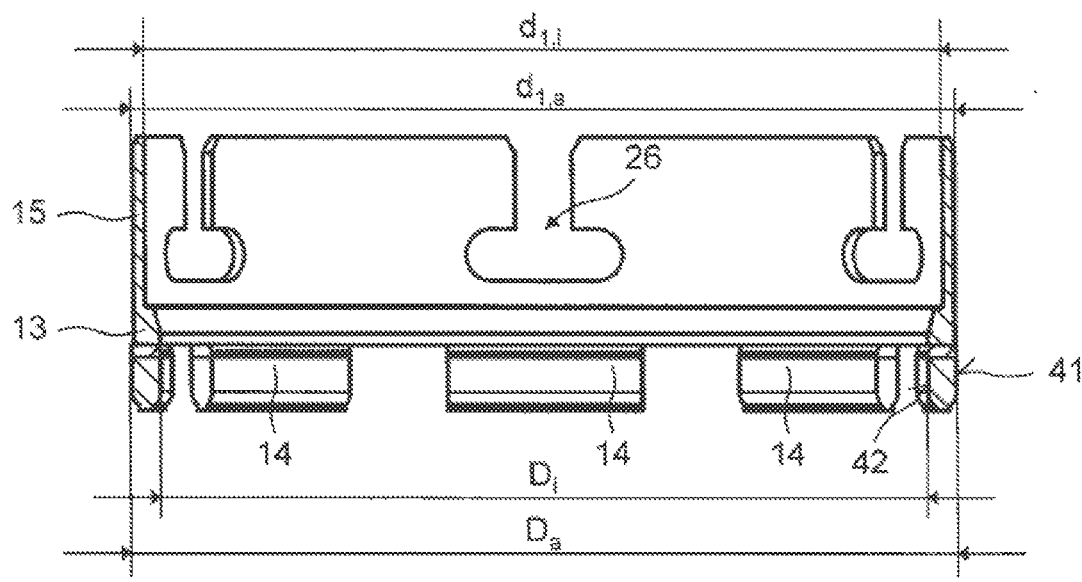
FIGS. 3A, B illustrate the cutting portion of the drill bit shown in FIG. 1 in a longitudinal view (FIG. 3A) and the insertion element of the cutting portion in an enlarged view (FIG. 3B)

FIGS. 3A, B show the cutting portion 11 of the drill bit 10 shown in FIG. 1 in the longitudinal section parallel to the plane of projection of FIG. 1A. Here, FIG. 3A shows the entire cutting portion 11 and FIG. 3B shows a slit-shaped clearance 26 in the outer insertion element 15 in an enlarged view.

The cutting portion 11 comprises the annular portion 13, the cutting elements 14, and the outer insertion element 15. The annular portion 13 and the outer insertion element 15 are designed in a monolithic fashion in the embodiment shown here. As an alternative to a monolithic design, the outer insertion element 15 may also be designed as a separate part and be connected subsequently to the annular portion 13.

The cutting elements 14 are disposed in one plane perpendicular to the axis of rotation 22 in a ring shape around the annular portion 13 and each comprise an outer edge 41 and an inner edge 42. The outer edges 41 of the cutting elements 14 form an outer circle with an outer diameter $D_a$ and the inner edges form an inner circle having an inner diameter $D_i$. The cutting elements 14 produce a drill bore in the substrate with a drill bore diameter corresponding to the outer diameter $D_a$. In the interior of the drill bit 10, a drill core results having a drill core diameter corresponding to the inner diameter $D_i$. The outer insertion element 15 has an outer diameter $d_{1,a}$ and an inner diameter $d_{1,i}$ perpendicular to the axis of rotation 22. Here, the outer diameter $d_{1,a}$ of the outer plug element 15 is smaller than the outer diameter $D_a$ and the inner diameter $d_{1,i}$ of the outer insertion element 15 is greater than the inner diameter $D_i$.

Figure 3B:
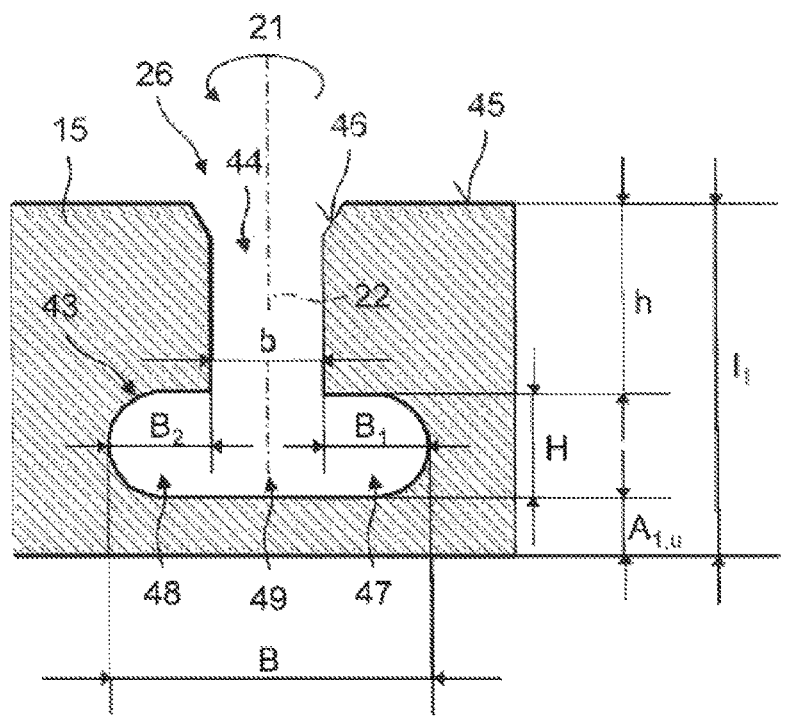

FIG. 3B shows a slit-shaped clearance 26 in the outer insertion element 15 in an enlarged view. The slit-shaped clearance 26 comprises a transverse slit 43 disposed perpendicular to the axis of rotation 22 and a connector slit 44 disposed parallel to the axis of rotation 22. The connector slit 44 connects the transverse slit 43 to an upper edge 45 of the outer insertion element 15, which is designed in an open fashion on the upper edge 45 in the region of the connector slit 44. The pin elements 25 are inserted via the connector slit 44 into the slit-shaped clearance 26 and displaced into the transverse slit 43 by a rotation around the axis of rotation 22. The transmission of torque from the pin element 25 onto the outer connector element 15 occurs in the transverse slit 43.

Figure 4A:
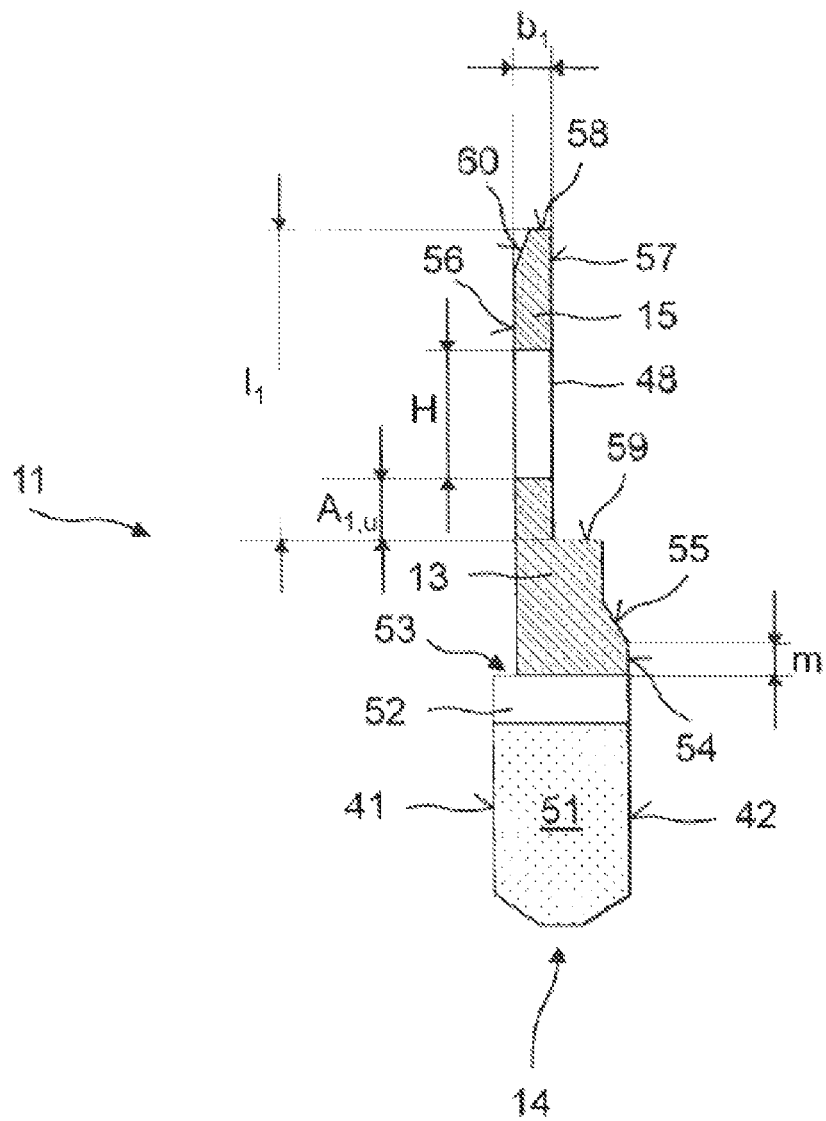
FIGS. 4A, B illustrate the cutting portion in a longitudinal section along the section plane B-B in FIG. 1A (FIG. 4A) and along the section plane C-C in FIG. 1B (FIG. 4B)

The outer insertion element 15 has a length l1 parallel to the axis of rotation 22 and a width $b_1$ perpendicular to the axis of rotation 22 (FIG. 4A). The transverse slit 43 has a width B perpendicular to the axis of rotation 22 and a height H parallel to the axis of rotation 22. The connector slit 44 has a width b perpendicular to the axis of rotation 22 and a height h parallel to the axis of rotation 22. The width of the connector slit 44 is greater than the pin diameter $2R_Z$ of the pin elements 25, such that the pin elements 25 can be easily inserted into the connector slit 44. Here, the insertion of the pin elements 25 can be facilitated using an inclined insertion surface 46 on the upper edge 45. The height h of the connector slit 44 is selected such that the cutting portion 11 is sufficiently able to withstand tensile forces during the release of a jammed drill bit. If the height h is selected to be too low, the risk is incurred of deforming the outer insertion element 15.

The transverse slit 43 has a lower distance $A_{1,u}$ from the annular portion 13 parallel to the axis of rotation 22 and an upper distance from the upper edge 45, with the upper distance corresponding to the height h of the connector slit 44. The lower distance $A_{1,u}$ from the annular portion 13 is selected in such a way that the cutting portion 11 is sufficiently able to withstand tensile force exerted by a drill stand. If the lower distance $A_{1,u}$ is selected to be too small, the risk is incurred of a deformation of the outer insertion element 15.

The transverse slit 43 comprises a catching region 47, a locking region 48, and a transitional region 49. The catching region 47 and the locking region 48 are disposed on different sides of the connector slit 44 relative to the rotational direction 21 of the drill bit 10, with the catching region and locking region 47, 48 being connected to the connector slit 44 via the transitional region 49. The catching area 47 is disposed on the side of the connector slit 44 facing the rotational direction 21 and the locking region 48 is disposed on the side opposite the rotational direction 21. The transmission of torque from the drill shaft portion 12 onto the cutting portion 11 occurs via the pin elements 25 and the catching region 47. The locking region 48 reduces the risk of the plug-and-twist connection 24 between the drill shaft portion 12 and the cutting portion 11 being unintentionally opened during the removal of a jammed drill bit from the substrate.

The catching region 47 has a width $B_1$ perpendicular to the axis of rotation 22 and the height of the catching region 47 corresponds to the height H of the transverse slit 43. The locking region 48 has a width $B_2$ perpendicular to the axis of rotation 22 and the height of the locking region 48 corresponds to the height H of the transverse slit 43. The widths $B_1$, $B_2$ of the catching region 47 and the locking region 48 are selected in such a way that the pin elements 25 can be held in the transverse slit 43 in the case of the exertion of tensile force and do not break out.

Figure 4B:
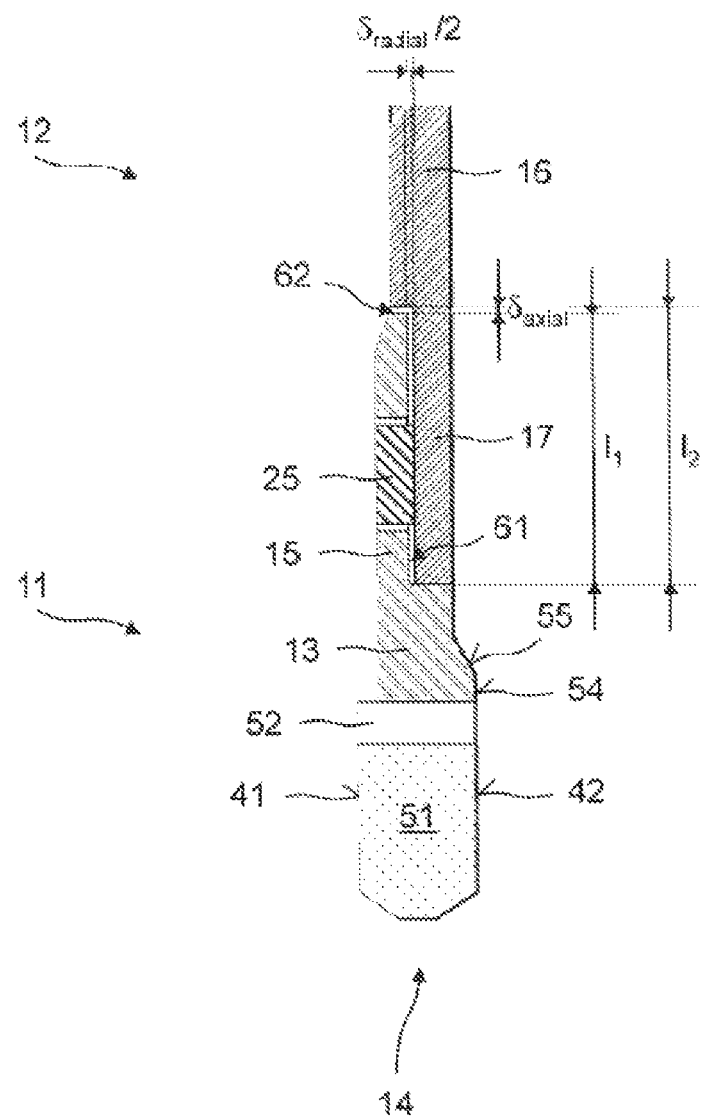

FIGS. 4A, B show the cutting portion 11 of the drill bit 10 according to the invention in a longitudinal section along the section plane B-B in FIG. 1A (FIG. 4A) and along the section plane C-C in FIG. 1B (FIG. 4B). The cutting portion 11 comprises the annular portion 13, the cutting elements 14, and the outer insertion element 15.

The cutting elements 14 are comprised of a matrix zone 51 and a neutral zone 52, with the matrix zone 51 being composed of a powder material to which cutting particles have been added and the neutral zone 52 being composed of a weldable powder material without cutting particles. The two-part structure of the cutting elements 14 is necessary in order to be able to weld the cutting elements 14 to the annular portion 13. The annular portion 13 rests flush against the inner edge 42 of the cutting element 14 and has a rebound 53 relative to the outer edge 41 of the cutting element 14.

The annular portion 13 comprises a guide portion 54 and a core removal portion 55 on its inner side. The core removal portion 55 has an inner diameter that reduces in the direction of the cutting elements 14; the oblique surface of the core removal portion 55 supports the removal of the drill core. The guide portion 54 rests flush against the cutting element 14 and, during drilling, forms a guide for the cutting elements 14; the guide portion 54 has a length m parallel to the axis of rotation 22. As an alternative to the guide on the inside of the drill bit 10, the guide portion may be disposed on the outside or on the outside and inside. The length m of the guide portion 54 is less than 4 mm. A guide portion that is less than 4 mm does not interfere with the supply of a cooling and rinsing medium, or at least does not do so to a substantial degree.

The outer insertion element 15 comprises an outer jacket surface 56, an inner jacket surface 57, and a face 58. An annular limit stop shoulder 59 is located at the transition from the annular portion 13 to the outer insertion element 15. In the cutting portion 11 shown in FIG. 4A, the outer insertion element 15 additionally comprises an oblique outer surface 60 whose diameter increases in the direction of the cutting elements 14.

FIG. 4B shows the cutting portion 11 and the drill shaft portion 12 that are connected via the plug-and-twist connection 24, with the pin element 25 being disposed in the locking region 48 of the transfer slit 43. In the connected state, the drill shaft portion 12 rests with its face 33 against the limit stop shoulder 59 of the cutting portion 11. Between the inner jacket surface 57 of the outer insertion element 15 and the outer jacket surface 31 of the inner insertion element 17, there is a radial gap 61. Here, the difference $\delta_{radial}$ between the inner diameter $d_{1,i}$ of the outer insertion element 15 and the outer diameter $d_{2,a}$ of the inner insertion element 17 is greater than 0.11 mm for all diameters. The length $l_2$ of the inner insertion element 17 is greater than the length $l_1$ of the outer insertion element 15, such that an axial gap 62 having the gap width $\delta_{axial}$ and is formed between the face 58 of the outer insertion element 15 and the limit stop shoulder 34 of the inner insertion element 17. The radial gap 61 and the axial gap 62 to ensure that the face 33 of the inner insertion element 17 rests against the limit stop shoulder 59 of the outer insertion element 15 and, during drilling, a defined transmission of force occurs from the drill shaft portion onto the cutting portion.

Figure 5:
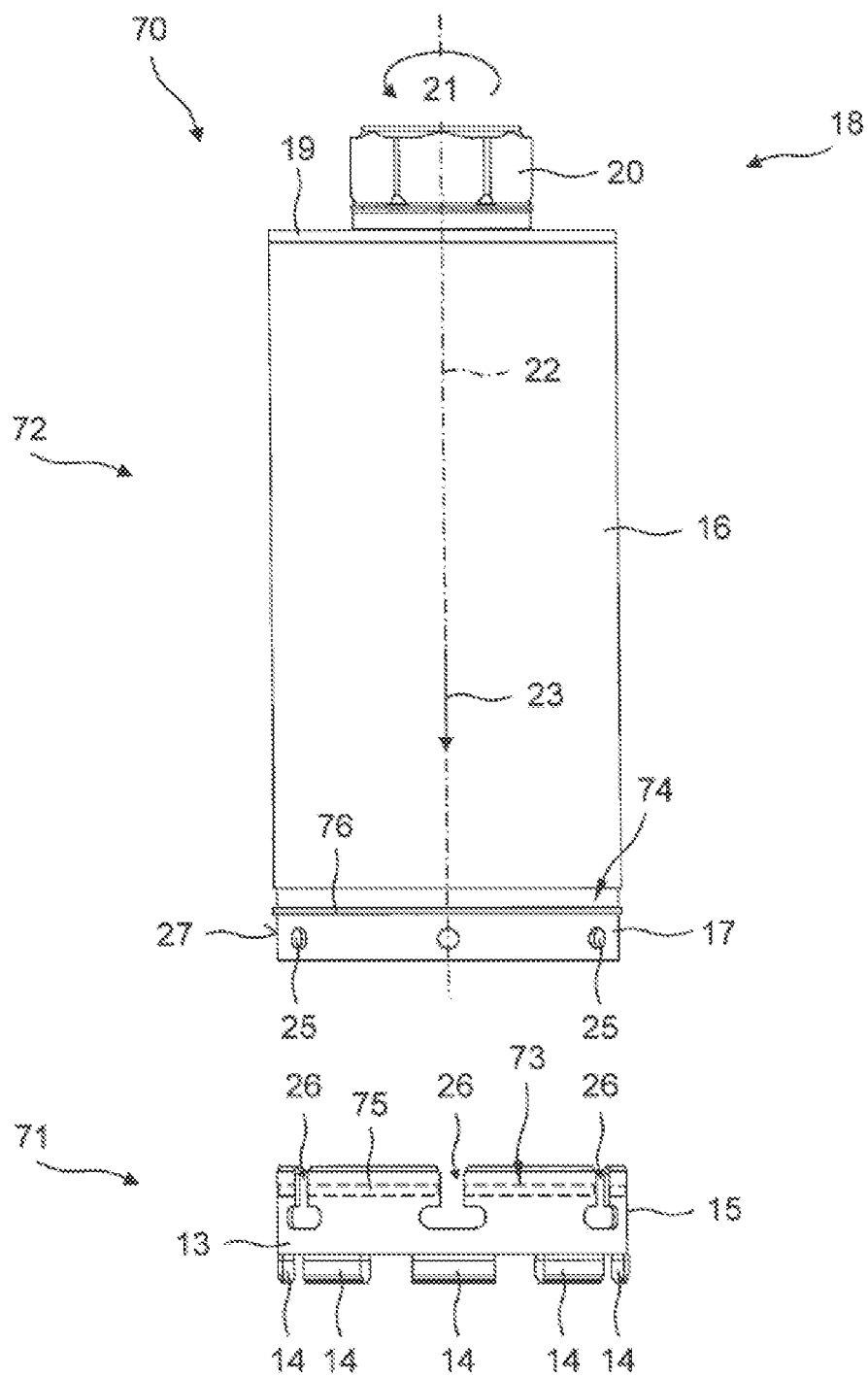
FIG. 5 illustrates an additional embodiment of a drill bit according to the invention having a cutting portion and a drill shaft portion that are connected in the axial direction via an additional positive connection as removal prevention.

FIG. 5 shows an additional embodiment of a drill bit 70 according to the invention having a cutting portion 71 and a drill shaft portion 72. The drill bit 70 differs from the drill bit 10 in that, in the axial direction, an additional positive connection is provided that impedes an unintentional release of the cutting portion 71 from the drill shaft portion 72.

In addition to the outer insertion element 15 and the slit-shaped clearances 26, the cutting portion 71 comprises a first connector unit 73 and the drill shaft portion 72, in addition to the inner insertion element 17 and the pin elements 25, comprises a second connector unit 74. The first connector unit 73 comprises a groove 75 disposed on the inside 57 of the outer connector element 15. The second connector unit 74 comprises a nose 76 that is disposed on the outside 28 of the inner insertion element 17 and that extends radially outward. In the connected state of the drill bit 70, the nose 76 and the groove 75 form a positive connection in the axial direction, i.e., in the drill direction 23, between the cutting portion 71 and the drill shaft portion 72. The cutting portion 71 is secured by means of the nose 76 and the groove 75 against the drill shaft portion 72 being pulled off of the cutting portion 71.

The nose 76 is disposed in the axial direction between the pin elements 25 and the drill shaft 16. In order to remove the drill shaft portion 72 from the cutting portion 71, a force is exerted on the face of the outer insertion element 15 with the aid of a tool. By the effect of the force, the elastic portion of the outer insertion element 15 is deflected and the positive connection between the nose 76 and the groove 75 can be released. The greater the distance of the nose 76 from the face 33 of the inner insertion element 17, the greater the deflection of the elastic portion. The groove 75 has an annular design and is disposed in a plane perpendicular to the axis of rotation 22. An annular groove that is disposed in the axial direction at the height of the slit-shaped clearances 26 supports the elastic effect of the portions of the outer insertion element 15 between the slit-shaped clearances 26.

The retaining force withstood by the nose 76 and the groove 75 can be adapted using the geometry of the nose 76 and the groove 75. Locking the nose 76 into the groove 75 should be as comfortable as possible for the operator; an oblique surface facilitates locking in. The radial height of the nose 76, i.e., its height in the radial direction, the contact surface between the nose 76 and the inner insertion element 17, and the angle of incline, for example, are suitable as geometric parameters for the adjustment of the retaining force.

The invention claimed is:

1. A drill bit that is rotatable in a rotational direction around an axis of rotation, comprising:
   a cutting portion having an annular portion, a cutting element connected on a first end of the annular portion, an outer insertion element connected on a second end of the annular portion, and an annular limit stop shoulder disposed at a transition from the annular portion to the outer insertion element; and
   a drill shaft portion having a cylindrical drill shaft and an inner insertion element, wherein the inner insertion element is connected to the cylindrical drill shaft at a first end and has an abutting face at a second end;
   wherein in a connected state the abutting face of the inner insertion element is in flush contact with the annular limit stop shoulder of the cutting portion, wherein the outer insertion element and the inner insertion element together form a plug connection in an insertion direction that is parallel to the axis of rotation and wherein the outer insertion element and the inner insertion element are connectable to each other via a pin element that is attached to an outside of the inner insertion element and is movable into a slit-shaped clearance in the outer insertion element;

wherein the slit-shaped clearance includes a connector slit and a transverse slit having a catching region and a locking region, wherein the catching region is disposed on a first side of the connector slit and the locking region is disposed on a second side of the connector slit; and wherein a nose is disposed on the outside of the inner insertion element, wherein the outer insertion element includes a groove, and wherein the nose and the groove form a positive connection in an axial direction in the connected state.

2. The drill bit according to claim 1, wherein a height of the connector slit parallel to the axis of rotation is at least 10 mm.

3. The drill bit according to claim 2, wherein the height of the connector slit parallel to the axis of rotation does not exceed 13 mm.

4. The drill bit according to claim 1, wherein the transverse slit has a distance parallel to the axis of rotation from a lower edge of the annular portion of at least 3 mm.

5. The drill bit according to claim 4, wherein the distance parallel to the axis of rotation from the lower edge of the annular portion does not exceed 5 mm.

6. The drill bit according to claim 1, wherein the pin element has a pin height perpendicular to the axis of rotation that is 68% to 89% of a width of the drill shaft.

7. The drill bit according to claim 1, wherein the pin element is cylindrical with a pin radius that is between 2.5 and 5 mm.

8. The drill bit according to claim 7, wherein a width of the catching region is not less than the pin radius plus 1.5 mm.

9. The drill bit according to claim 8, wherein the width of the catching region does not exceed the pin radius plus 3 mm.

10. The drill bit according to claim 8, wherein the width of the catching region is greater than a width of the locking region.

11. The drill bit according to claim 8, wherein the width of the catching region and a width of the locking region are equal.

12. The drill bit according to claim 1, wherein a length of the inner insertion element is greater than a length of the outer insertion element.

13. The drill bit according to claim 12, wherein the length of the outer insertion element is at least 18 mm.

14. The drill bit according to claim 13, wherein the length of the outer insertion element does not exceed 28 mm.

15. The drill bit according to claim 1, wherein the outer insertion element and the inner insertion element are annular with a difference between an inner diameter of the outer insertion element and an outer diameter of the inner insertion element being greater than 0.11 mm.

16. The drill bit according to claim 15, further comprising one or more additional pin elements that are attached to the outside of the inner insertion element and further comprising one or more additional slit-shaped clearances, wherein a number of the slit-shaped clearances is greater than or equal to a number of the pin elements.

17. The drill bit according to claim 1, wherein the annular portion includes a guide portion, wherein the guide portion rests flush against an outer edge, an inner edge, or against the outer edge and the inner edge of the cutting element parallel to the longitudinal axis.

18. The drill bit according to claim 17, wherein a length of the guide portion parallel to the axis of rotation is less than 4 mm.

19. The drill bit according to claim 1, wherein the nose is disposed in the axial direction between the pin element and the drill shaft and wherein the groove is disposed in the axial direction at a level of the slit-shaped clearance.

20. The drill bit according to claim 1, wherein the groove is annular and is disposed in a plane perpendicular to the axis of rotation.

* * * * *